United States Patent
Schneemann

[11] Patent Number: 6,127,963
[45] Date of Patent: Oct. 3, 2000

[54] MOTOR VEHICLE RADAR SENSOR

[75] Inventor: Joerg Schneemann, Weissach, Germany

[73] Assignee: Robert Bosch GmbH, Stuttgart, Germany

[21] Appl. No.: 09/070,137

[22] Filed: Apr. 30, 1998

[30] Foreign Application Priority Data

May 14, 1997 [DE] Germany ............................ 197 19 953

[51] Int. Cl.$^7$ ..................................................... G01S 13/93
[52] U.S. Cl. ............................................................ 342/70
[58] Field of Search ............................. 342/70, 149, 379, 342/374, 383, 380

[56] References Cited

U.S. PATENT DOCUMENTS

| 4,023,172 | 5/1977 | Schmidt | 342/149 |
| 4,845,507 | 7/1989 | Archer et al. | 342/374 |
| 5,481,268 | 1/1996 | Higgins . | |

FOREIGN PATENT DOCUMENTS

WO97/02496  1/1997  WIPO .

OTHER PUBLICATIONS

D.A. Williams "Millimetre Wave RADARS for Automotive Applications" in "International Microwave Symposium Digest", 1992 IEEE, pp. 721–724.

*Primary Examiner*—Ian J. Lobo
*Attorney, Agent, or Firm*—Kenyon & Kenyon

[57] ABSTRACT

A motor vehicle radar sensor having an antenna arrangement includes a focusing element and at least three first exciter elements which, in conjunction with the focusing element, constitute at least three principal lobes which overlap at most partially and which are switchably or permanently connectable or connected to first transmission and/or reception circuits of the radar sensor, such that at least one further exciter element is present, which is connected directly in parallel with one of the first exciter elements in such a way that these two exciter elements obtain their signals together from the same transmission circuit, and deliver them together to the same reception circuit. An arrangement of this kind makes it possible to produce in the antenna diagram of the radar sensor a shoulder-like protrusion of a principal lobe which advantageously expands the observable angular region, particularly in the close-in range.

12 Claims, 4 Drawing Sheets

MOTOR VEHICLE RADAR SENSOR

FIELD OF THE INVENTION

The present invention relates to a motor vehicle radar sensor, specifically in the context of an automatic clearance warning system or an adaptive vehicle speed regulation system.

BACKGROUND INFORMATION

A radar sensor is described in PCT International Publication No. WO 97/02496. This document describes a monostatic FMCW radar sensor for a vehicle and for the detection of objects, in which at least one antenna feed is configured, in conjunction with a dielectric lens, both for transmission and for reception of a corresponding echo signal. According to one exemplary embodiment, this radar sensor has three antenna feeds which are each used for transmission and reception. For this, each of the three antenna feeds is connected via a transmission/reception splitter to downstream transmission and reception circuits. The transmission/reception splitter is implemented in the form of a ring coupler. This radar sensor as described is thus a triple-beam radar sensor which is suitable for determining an angular position of detected radar targets.

In the course of development, the following difficulty has arisen with a radar sensor of this kind: In order to achieve the necessary angular resolution required in order to assign detected objects to individual travel lanes, the antenna lobes which belong to the individual antenna feeds must be comparatively narrow. This has the disadvantage, however, that an object, for example a vehicle traveling ahead, which is located in an adjacent lane at a comparatively short distance in front of the vehicle equipped with a radar sensor of this kind can be detected only poorly or not at all. For example, with a radar sensor which possesses an observable angular region of +/−5 degrees, a vehicle traveling in an adjacent parallel lane and with a lateral clearance of 1 m will be detected only at a distance of 15 m. It is thus desirable to enlarge the observable angular region in the close-in range of a radar sensor of this kind. A variety of possibilities may be imagined for doing this, but several of these have associated disadvantages. For example, a widening of the observable angular region by way of a widening of the antenna lobes or a spreading of the antenna lobes would degrade the achievable angular resolution and reduce the detection range. The use of further, additional antenna lobes, on the other hand, results in elevated costs due to the additional signal processing circuits associated therewith. The same applies to mechanical or electronic slewing of the antenna lobes which are present.

A further possibility is to use a corrected ("shaped") lens system, with which, by means of specific shaping of the lens surfaces, a largely configurable antenna diagram can be generated. The disadvantage, however, is that such lenses are much thicker than the usual antenna lenses, and accordingly exhibit higher weight and greater losses. In addition, exact shaping is possible only for a single antenna feed, and degradations then occur in the other antenna lobes of a multiple-beam radar system. A lens system of this kind is moreover highly sensitive to mechanical tolerances, in particular, when a corresponding radar sensor is installed on a motor vehicle.

The stated problem of additionally detecting vehicles traveling alongside in the close-in range in fact becomes even worse on one side if a corresponding radar sensor cannot be installed in the center of the vehicle with respect to the vehicle's longitudinal axis. If a radar sensor of this kind is installed, for example, below the right front headlight of a vehicle, the "blind" area on the left side of the vehicle becomes larger.

SUMMARY OF THE INVENTION

An object of the present invention is to provide a motor vehicle radar sensor whose observable angular region in the close-in range is widened in a simple and economical manner, or whose observable angular region in the close-in range can be widened as required in a simple and economical manner. The latter is necessary, in particular, when a radar sensor according to the present invention is applied to different models of motor vehicle. In this context, the widening is intended only to have an insignificant effect on the previously achieved properties of the radar sensor, for example, angular resolution, range, or power balance.

According to the present invention, this object is achieved by the fact that there is present in the radar sensor a further exciter element which is connected directly in parallel with one of the first exciter elements in such a way that these two exciter elements obtain their signals together from the same transmission circuit, and deliver them together to the same reception circuit. According to a preferred embodiment of the present invention, the further exciter element is connected via a power divider to the first exciter element, the power divider being designed so that during transmission, a lesser portion of the power can be delivered to the further exciter element, and a greater portion of the power to the first exciter element. This creates, according to the present invention, a motor vehicle radar sensor having an antenna arrangement including a focusing means and at least two exciter elements which, in conjunction with the focusing means, constitute an antenna diagram which has at least two principal lobes which overlap at most partially, and at least one of the principal lobes having a shoulder-like protrusion on one flank. This shoulder-like protrusion lies at an amplitude level which is sufficiently high that the first zero point in the antenna diagram is filled. Preferably it lies higher than the maximum amplitude value reached by the largest secondary lobe in the antenna diagram. On the other hand, this shoulder-like protrusion preferably lies below the 3-dB point of the principal lobes of the antenna diagram. The amplitude level of the shoulder-like protrusion is determined in this context by, among other things, the divider ratio of the power divider according to the present invention.

The radar system according to the present invention provides a simple and economical widening of the observable angular region in the close-in range. A radar sensor according to the present invention can thus be adapted very well to different models of motor vehicle. Also, the radar sensor according to the present invention only insignificantly reduces the range of the sensor for a given transmitting power. Conversely, only an insignificantly higher transmitting power is necessary in order to achieve the same range as with a radar sensor of the species. As compared with the use of a shaped lens system, the radar sensor according to the present invention is much less sensitive to mechanical tolerances during installation.

DETAILED DESCRIPTION

Figure 1:
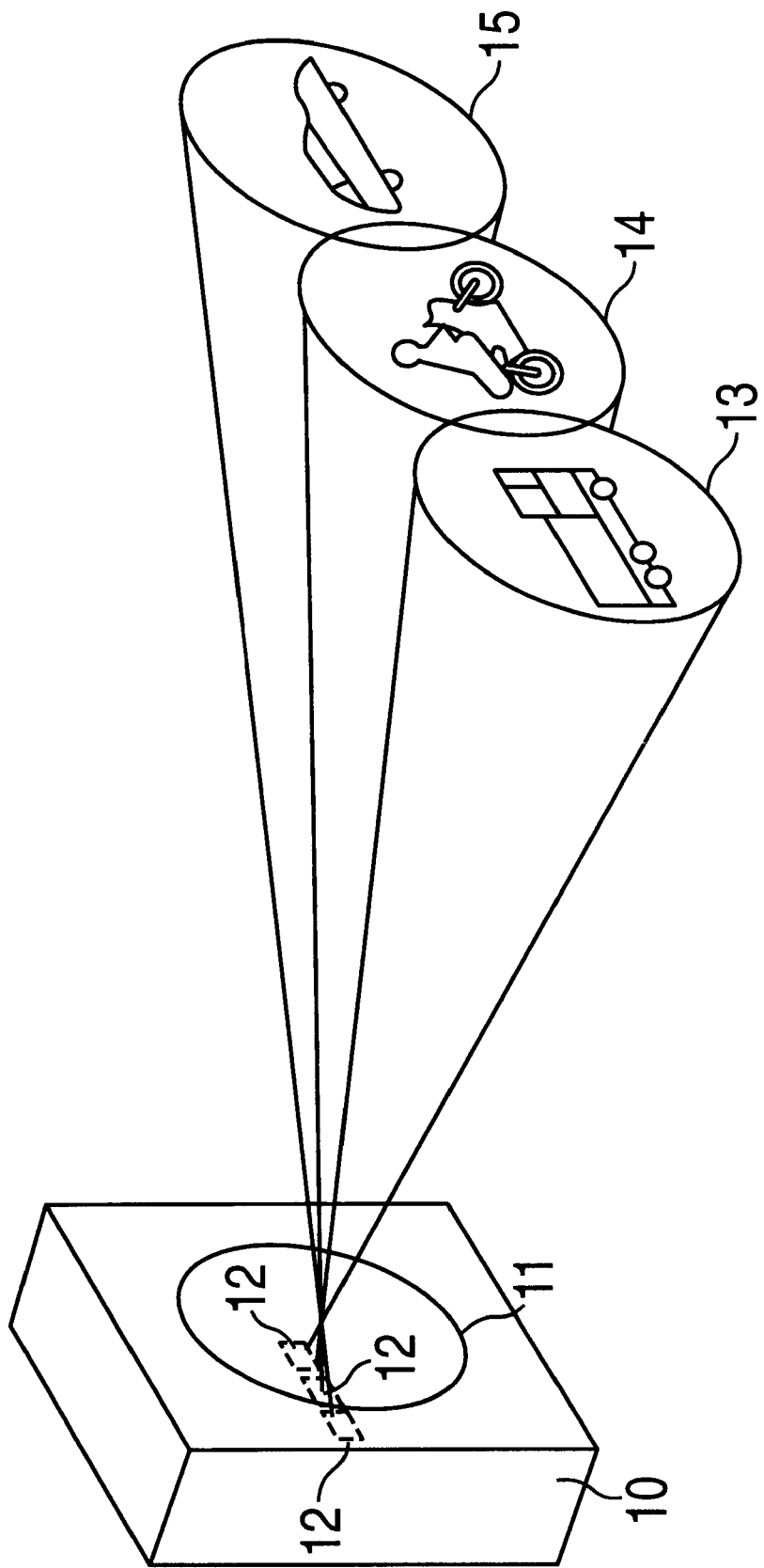
FIG. 1 shows a schematic sketch of a radar sensor according to the existing art.

FIG. 1 shows a schematic sketch of a radar sensor according to the existing art. It is housed in a compact housing 10 which can be installed on a motor vehicle and which comprises an antenna arrangement including a dielectric lens 11 and three exciter elements 12. In conjunction with the dielectric lens, each of the three exciter elements 12 constitutes an antenna lobe 13, 14, 15. Antenna lobes 13, 14, 15 lie next to one another, and overlap only partially. By sequential switching between the various antenna lobes, or by means of an amplitude or phase comparison between the received signals of the individual antenna lobes, it is possible to determine an angular position of detected radar targets. Corresponding methods are commonly known in the existing art.

Figure 2:
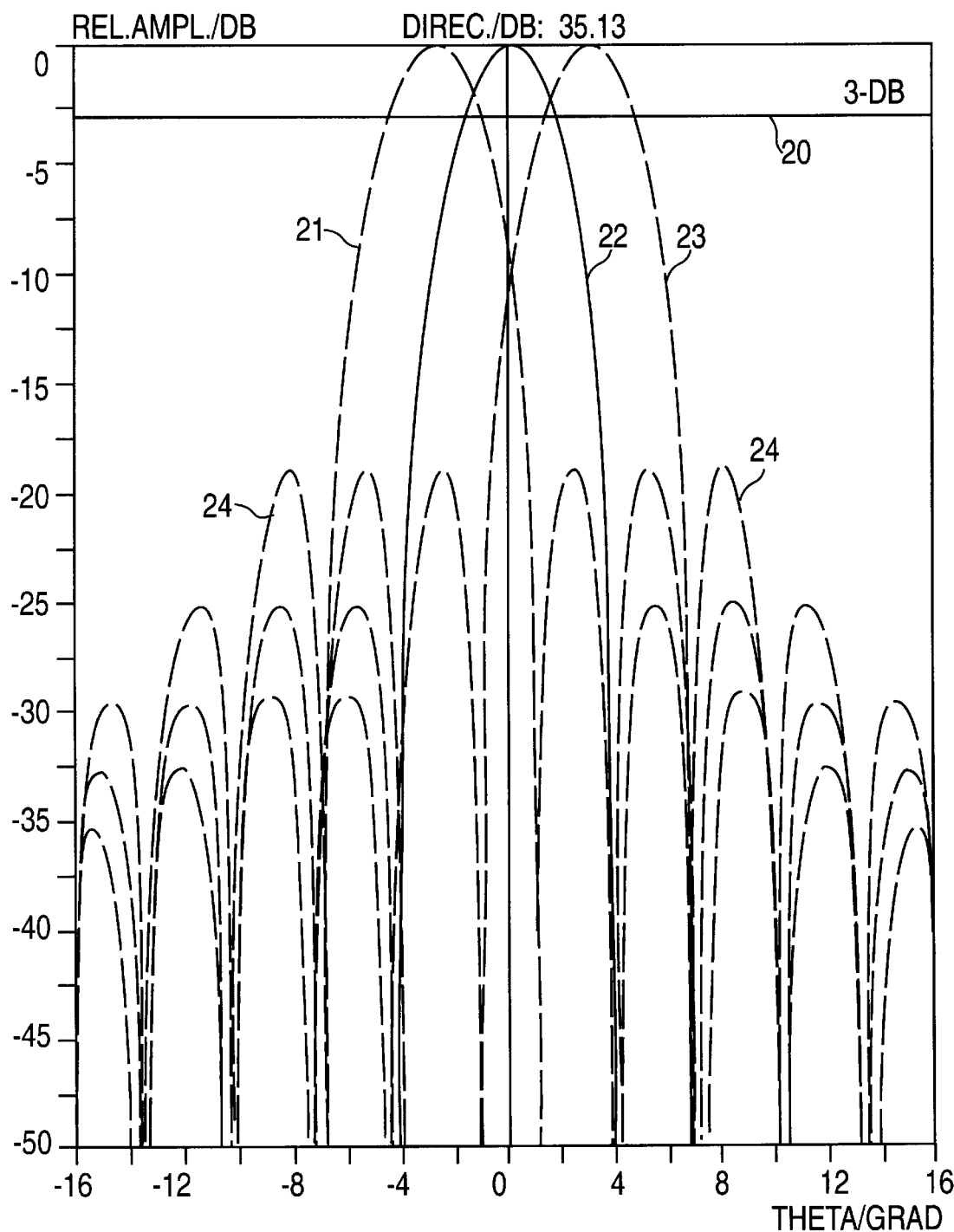
FIG. 2 shows an antenna diagram of a radar sensor according to the existing art.

FIG. 2 shows a calculated antenna diagram of a radar sensor according to the prior art. Indicated along the abscissa, symmetrically to the right and left with respect to the center axis, are angular values at which a radar target may be located relative to the radar sensor. Amplitude values of the antenna diagram or of a reference signal, standardized to a maximum value and accordingly indicated in decibels, are indicated on the ordinate. A line 20 lies 3 dB below the maximum value of the antenna diagram. Three principal lobes 21, 22, 23, which correspond to the graphically sketched antenna lobes 13, 14, 15 in FIG. 1, are clearly evident. Also evident are numerous secondary lobes 24 which are usually present in any real antenna diagram. Principal lobes 21, 22, 23 partially overlap one another, as already indicated in FIG. 1.

Figure 3:
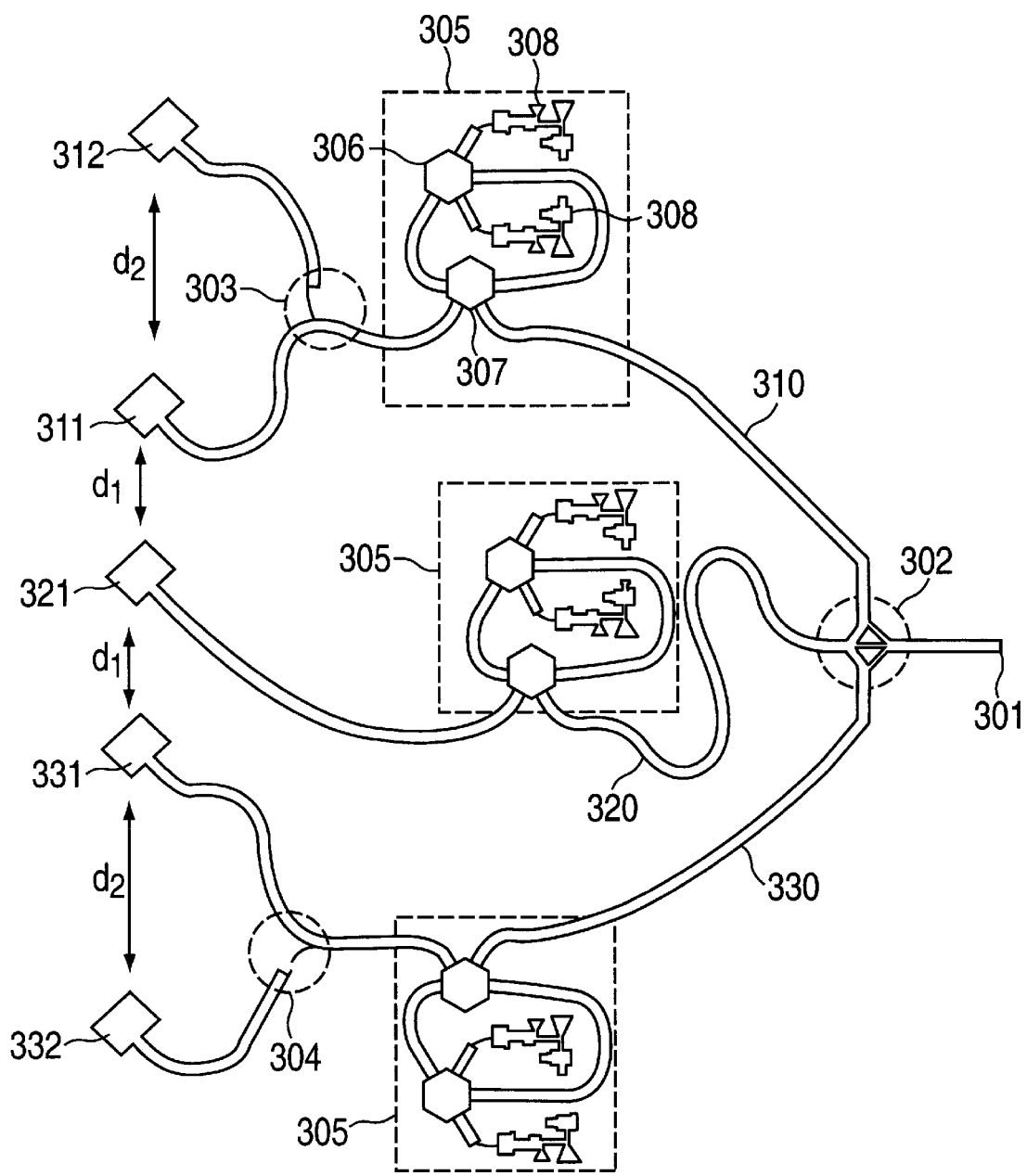
FIG. 3 shows a stripline structure of an exemplary arrangement of exciter elements according to the present invention.

FIG. 3 shows a stripline structure which has an exemplary arrangement of exciter elements according to the present invention. Three parallel signal paths 310, 320, and 330 are evident, which are fed via a power divider 302 and a common input 301. Each of the three signal paths has a first signal processing circuit 305. This comprises in each case two ring couplers 306, 307 to separate the transmitted and received signals, as well as two circuit structures 308. Circuit structures 308 contain mixer stages for a first processing of received radar signals. In accordance with the FMCW radar principle used here, a portion of the transmitted signals delivered via input 301 is used for mixing. Circuit 305 as a whole combines the functions of a transmission/reception splitter and of a first reception mixer stage. The received and mixed-down radar signals can be tapped from circuit structures 308, preferably by means of a throughplating (not shown) on the underside of the stripline structure.

A further terminal of each signal processing circuit 305 leads to a—or, according to the present invention, to two—exciter elements 311, 312, 321, 331, and 332 connected directly in parallel with one another. In the present example, these are configured as patch elements, and are arranged in a row. Exciter elements 312 and 332 which lie at the beginning and end of the row constitute the core of the present invention. They are connected in parallel, or at least can be connected in parallel, preferably via power dividers 303, 304, directly to exciter elements 311 and 331. Spacing $d_2$ between exciter element 311 and 312 and between exciter element 331 and 332 is preferably greater than spacing $d_1$ between exciter elements 311 and 321, and 321 and 331.

Figure 4:
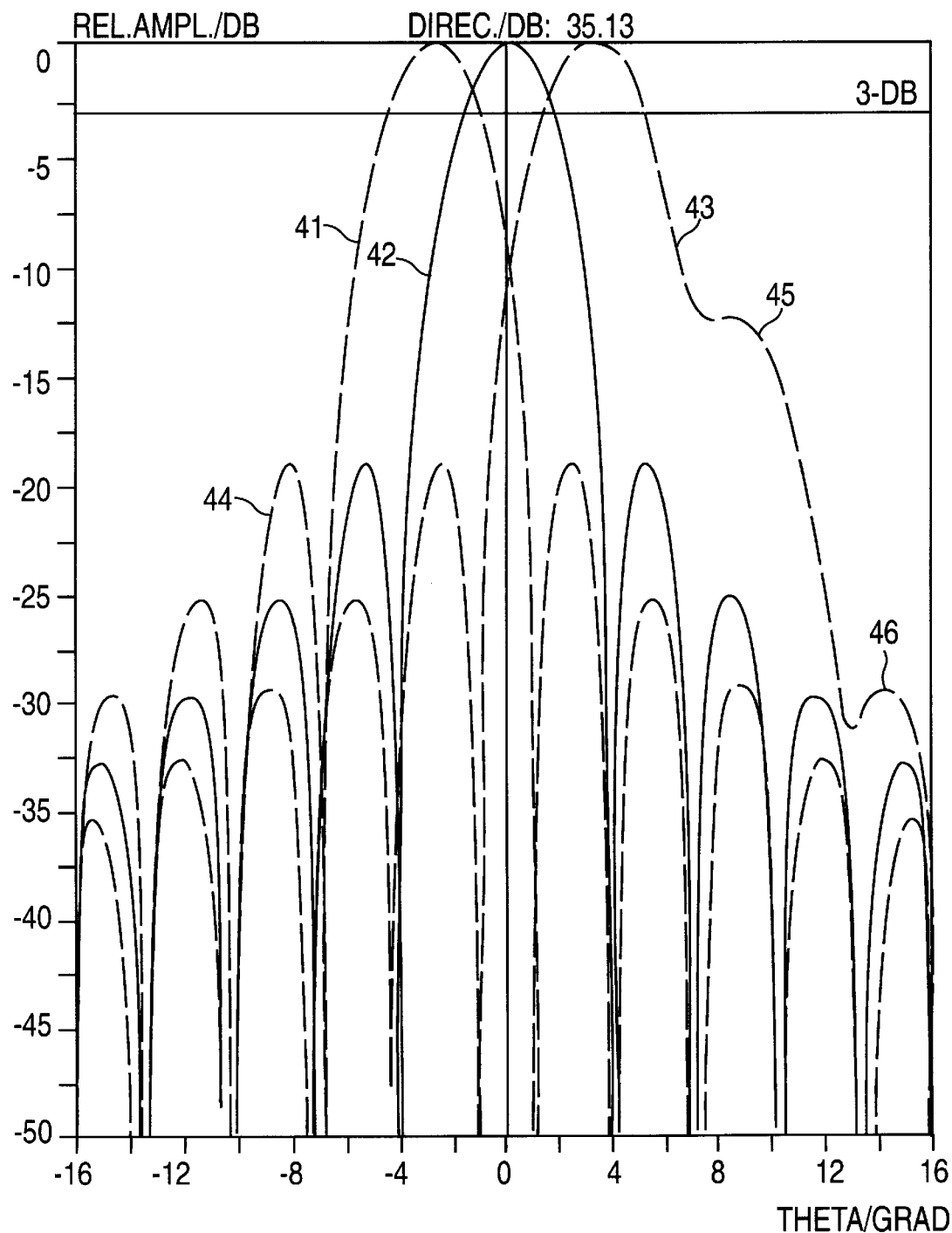
FIG. 4 shows an exemplary antenna diagram of a radar sensor according to the present invention.

FIG. 4 shows, by way of example, the antenna diagram of a radar system according to the present invention having an exciter arrangement as shown in FIG. 3. The three principal lobes 41, 42, and 43, as well as numerous secondary lobes 44, 46, are once again evident. According to the present invention, the right-hand principal lobe 43 has a shoulder-like protrusion 45 whose amplitude level is greater than the maximum amplitude of the largest secondary lobe 44. Conversely, in this exemplary embodiment the amplitude level of the shoulder-like protrusion is approximately 12 dB below the maximum value of principal lobe 42. As is evident, the maximum value of principal lobe 43 here is lower than the maximum value of principal lobes 41 and 42. This is a result of the fact that a proportion of the transmitting power, determined by the divider ratio of power divider 303, is, in this case, radiated via exciter element 312. Since the latter is offset laterally with respect to exciter element 311, a lower power level, corresponding to the divider ratio, is transmitted in the principal beam direction of exciter element 311. In graphic terms, this small portion of the transmitting power is diverted to constitute the shoulder-like protrusion. The reduction in range can, if necessary, be compensated for by feeding a correspondingly greater transmitting power into signal path 310. Given the magnitude of the reduction, however, this is not necessary in the present exemplary embodiment.

In accordance with the significance of an antenna diagram, the result of shoulder-like protrusion 45 is that the observable angular region of a radar sensor according to the present invention is widened toward the right, as compared with a radar sensor according to the existing art, in the close-in range. As already discussed, this is achieved in this case at the cost of a slight reduction in the range of the right-hand principal lobe 43, which is nevertheless negligible because of its size. The reason for shoulder-like protrusion 45 is the use, according to the present invention, of the additional exciter element 312. The amplitude level of the protrusion—and also, associated therewith, the amount by which the range of principal lobe 43 decreases—can be established by way of the divider ratio of power divider 303. The location of shoulder 45 is determined by the geometrical dimensions of exciter element 312 with respect to the other exciter elements. The location and form of shoulder-like protrusion 45 can be established by the selection of spacing $d_2$. The greater the spacing $d_2$ selected, the further outward shoulder-like protrusion 45 will project. At the same time, however, an increasingly stronger indentation will be established between principal lobe 43 and shoulder-like protrusion 45, so that shoulder-like protrusion 45 will then act more like an additional secondary lobe 44.

It is left to the discretion of the person skilled in the art to achieve an optimum compromise here between the desired width of principal lobe 43, including shoulder-like protrusion 45, and an amplitude profile in the flank region of the principal lobe which is as homogeneous as possible, i.e. decreases approximately monotonically. In this context, it has proven advantageous to select a spacing $d_2$ which is greater than spacing $d_1$ between exciter elements 311 and 321, and 321 and 331. It is advantageous to select width $d_2$ such that additional exciter element 312, 332 lies outside the 3-dB opening angle of principal lobes 43, 41.

Corresponding to the object stated initially, a radar sensor according to the present invention is preferably configured in such a way that shoulder-like protrusion 45 is located on the outer side of an outer antenna lobe 43. It is, however, also contemplated by the present invention to provide a shoulder-like protrusion on the inner side of one or more adjacent principal lobes, if the "viewing direction" of said principal lobes is to be widened laterally.

If necessary, a shoulder-like protrusion 45 can also be achieved, in the manner described previously, with the second outer antenna lobe 41. This is often not necessary, however, especially not when a radar sensor according to the present invention is mounted at the right front or left front of a motor vehicle. In order to decrease application complexity in such cases, however, provision is preferably made, according to FIG. 3, for only one further exciter element actually to be connected to the transmission/reception circuits of the radar sensor. This can be implemented economically by connecting both further exciter elements 312, 332 to the transmission/reception circuits of the radar sensor during series production of a radar sensor, but severing the unneeded connection again during final installation of the radar sensor. This is shown in the case of power divider 304 in FIG. 3. Conversely, of course, both exciter elements 312, 332 can initially remain uncontacted, and only the particular one needed is connected, for example, by bonding, to the transmission/reception circuits of the sensor in a final operating step. If the power divider is equipped, for example, with PIN diode switches, the shoulder-like protrusion can be selectably activated, optionally even while the radar sensor is in operation.

Moving beyond the exemplary embodiment depicted here, the present invention can be used both with the FMCW radar shown here and also with a pulsed radar. As an alternative to the stripline structure depicted here and the patch elements used, the exciter elements can also be implemented as dipoles or, for example, with waveguide technology. The same is true for the feed-in lines and power dividers connected thereto. It is moreover possible, by connecting multiple additional exciter elements in parallel, to configure on an antenna lobe, in stepped fashion, multiple shoulder-like protrusions with various, preferably decreasing amplitude levels. This can advantageously be used to illuminate a close-in region around the radar sensor very broadly and, conversely, a remote region relatively narrowly.

What is claimed is:

1. A motor vehicle radar sensor having an antenna arrangement, comprising:
    a focusing element;
    at least three exciter elements, wherein each one of the at least three exciter elements is one of switchably connected and permanently connected to one of a transmission circuit and a reception circuit of the radar sensor, wherein the at least three exciter elements and the focusing element form at least three principal lobes which overlap at most partially; and
    at least one additional exciter element connected directly in parallel with at least one of the at least three exciter elements, wherein the at least one additional exciter element and the at least one of the at least three exciter elements together obtain a first signal from the transmission circuit and together deliver a second signal to the reception circuit.

2. The motor vehicle radar sensor according to claim 1, further comprising a power divider for connecting the at least one additional exciter element to the at least one of the at least three exciter elements, wherein the power divider transmits a lesser portion of power to the at least one additional exciter element, and a greater portion of power to the at least one of the at least three exciter elements.

3. The motor vehicle radar sensor according to claim 1, wherein the at least three exciter elements are arranged substantially in a row, and wherein the at least one additional exciter element is arranged at one of a beginning and a end of the row.

4. The motor vehicle radar sensor according to claim 1, wherein a spacing between the at least one additional exciter element and the at least one of the at least three exciter elements is sufficient so that the at least one additional exciter element lies outside a 3-dB opening angle of at least one of the at least three principal lobes associated with the at least one of the at least three exciter elements.

5. The motor vehicle radar sensor according to claim 1, wherein a first spacing between the at least one additional exciter element and the at least one of the at least three exciter elements is greater than a second spacing between the at least one of the at least three exciter elements and an adjacent one of the at least three exciter elements.

6. The motor vehicle radar sensor according to claim 1, wherein the at least one additional exciter element includes two additional exciter elements, and wherein at least one of the two additional exciter elements lacks an electrically conductive connection to the at least three exciter elements.

7. The motor vehicle radar sensor according to claim 1, wherein the at least three exciter elements and feed lines of the at least three exciter elements are configured using stripline technology.

8. A multiple-beam motor vehicle radar sensor having an antenna arrangement, comprising:
    a focusing element; and
    at least three exciter elements, wherein the at least three exciter elements and the focusing element form an antenna diagram having at least three principal lobes which overlap at most partially, and wherein at least one of the at least three principal lobes has at least one shoulder-like protrusion at a flank.

9. The multiple-beam motor vehicle radar sensor according to claim 8, wherein the at least one shoulder-like protrusion lies at an amplitude level higher than a maximum amplitude reached by secondary lobes.

10. The multiple-beam motor vehicle radar sensor according to claim 8, wherein the at least one shoulder-like protrusion lies at least 3 dB below a maximum amplitude of the at least one of the at least three principal lobes having the at least one shoulder-like protrusion.

11. The multiple-beam motor vehicle radar sensor according to claim 8, wherein the at least three principal lobes are arranged substantially in a row, and wherein the at least one shoulder-like protrusion is arranged on an outer side of the at least one of the at least three principal lobes having the at least one shoulder-like protrusion.

12. The motor vehicle radar sensor according to claim 1, wherein the observable angular region of the motor vehicle radar sensor is widened toward the right in the close-in range.

* * * * *